United States Patent
Chen

(10) Patent No.: US 10,764,301 B2
(45) Date of Patent: Sep. 1, 2020

(54) METHOD AND SYSTEM FOR USER AUTHENTICATION BASED ON A VISUAL REPRESENTATION OF USER LOCATION

(71) Applicant: Yahoo Holdings, Inc., Sunnyvale, CA (US)

(72) Inventor: Chien-Hung Zordius Chen, Taipei (TW)

(73) Assignee: Oath Inc., New York, NY (US)

( * ) Notice: Subject to any disclaimer, the term of this patent is extended or adjusted under 35 U.S.C. 154(b) by 0 days.

(21) Appl. No.: 14/943,197

(22) Filed: Nov. 17, 2015

(65) Prior Publication Data
US 2017/0142126 A1 May 18, 2017

(51) Int. Cl.
*H04L 29/06* (2006.01)
*H04W 12/06* (2009.01)
*G06F 21/31* (2013.01)
*G06F 21/36* (2013.01)
*H04W 12/00* (2009.01)

(52) U.S. Cl.
CPC .......... *H04L 63/107* (2013.01); *G06F 21/31* (2013.01); *G06F 21/36* (2013.01); *H04L 63/08* (2013.01); *H04W 12/06* (2013.01); *H04W 12/00503* (2019.01); *H04W 12/00504* (2019.01)

(58) Field of Classification Search
CPC ....... H04L 63/08; H04L 63/107; G06F 21/31; G06F 21/36; H04W 12/06
See application file for complete search history.

(56) References Cited

U.S. PATENT DOCUMENTS

| | | | |
|---|---|---|---|
| 8,166,068 B2 | 4/2012 | Stevens | |
| 9,232,046 B2* | 1/2016 | Naqvi | H04L 67/306 |
| 9,300,645 B1* | 3/2016 | Rao | H04L 63/08 |
| 9,330,316 B2* | 5/2016 | Hicks | G06K 9/00771 |
| 9,697,348 B1* | 7/2017 | Maresh | G06F 21/36 |
| 9,811,653 B1* | 11/2017 | Maresh | G06F 21/36 |
| 10,055,569 B2* | 8/2018 | Maresh | H04L 63/08 |
| 10,148,631 B1* | 12/2018 | Sokolov | H04L 63/08 |
| 2004/0093527 A1* | 5/2004 | Pering | G06F 21/36 726/5 |

(Continued)

OTHER PUBLICATIONS

M. Portnoi and C. Shen, "Loc-Auth: Location-enabled authentication through attribute-based encryption," 2015 International Conference on Computing, Networking and Communications (ICNC), Garden Grove, CA, 2015, pp. 89-93. (Year: 2015).*

(Continued)

*Primary Examiner* — Kari L Schmidt
(74) *Attorney, Agent, or Firm* — Pillsbury Winthrop Shaw Pittman LLP

(57) ABSTRACT

The present teaching relates to user authentication based on a visual representation of a location. In one example, a request is received for authenticating a user with respect to a user identity. A location of the user is determined. A candidate visual representation of the location is obtained from the user. One or more visual representations are retrieved from a database. The retrieved one or more visual representations are associated with the user identity in the database. Whether the user is authenticated is determined based on the candidate visual representation and the retrieved one or more visual representations.

21 Claims, 14 Drawing Sheets

(56) References Cited

U.S. PATENT DOCUMENTS

| | | | | |
|---|---|---|---|---|
| 2007/0220267 | A1* | 9/2007 | Inoue | G06F 21/32 |
| | | | | 713/176 |
| 2008/0226130 | A1* | 9/2008 | Kansal | G01C 21/20 |
| | | | | 382/106 |
| 2009/0064321 | A1* | 3/2009 | Dick | H04L 63/107 |
| | | | | 726/21 |
| 2011/0320353 | A1* | 12/2011 | Mehew | G06Q 20/206 |
| | | | | 705/44 |
| 2012/0011575 | A1* | 1/2012 | Cheswick | G01S 19/14 |
| | | | | 726/5 |
| 2012/0070029 | A1* | 3/2012 | Muriello | G06F 21/44 |
| | | | | 382/100 |
| 2012/0304284 | A1* | 11/2012 | Johnson | H04L 9/3226 |
| | | | | 726/19 |
| 2013/0132477 | A1* | 5/2013 | Bosworth | G06Q 50/01 |
| | | | | 709/204 |
| 2013/0176437 | A1* | 7/2013 | Tseng | H04N 21/25875 |
| | | | | 348/156 |
| 2013/0269013 | A1* | 10/2013 | Parry | H04L 63/0861 |
| | | | | 726/7 |
| 2014/0137221 | A1* | 5/2014 | Dominic | H04W 12/06 |
| | | | | 726/7 |
| 2014/0254865 | A1* | 9/2014 | Soubra | G06K 9/00624 |
| | | | | 382/103 |
| 2014/0298433 | A1* | 10/2014 | McLaughlin | H04L 63/08 |
| | | | | 726/6 |
| 2014/0370869 | A1* | 12/2014 | Naqvi | H04W 8/22 |
| | | | | 455/418 |
| 2015/0066762 | A1* | 3/2015 | Chatterton | G06Q 20/40 |
| | | | | 705/44 |
| 2015/0095352 | A1* | 4/2015 | Lacey | G06F 17/30011 |
| | | | | 707/752 |
| 2015/0332128 | A1* | 11/2015 | Sadovsky | G07D 7/2025 |
| | | | | 382/182 |
| 2017/0054899 | A1* | 2/2017 | Sadhwani | H04N 5/23206 |
| 2018/0114009 | A1* | 4/2018 | Maresh | G06F 21/36 |
| 2018/0198790 | A1* | 7/2018 | Weis | H04W 12/06 |

OTHER PUBLICATIONS

Yardi, Sarita, Nick Feamster, and Amy Bruckman. "Photo-based authentication using social networks." Proceedings of the first workshop on Online social networks. 2008, pp. 55-60. (Year: 2008).*

M. Bucicoiu and N. Tapus, "Easy attendance: location-based authentication for students integrated with moodle," 2013 11th RoEduNet International Conference, Sinaia, 2013, pp. 1-4. (Year: 2013).*

Feng Zhang et al., "Location-Based Authentication and Authorization Using Smart Phones," Proceedings of the 2012 IEEE 11th International Conference on Trust, Security and Privacy in Computing and Communications, Jun. 25, 2012, pp. 1285-1292.

* cited by examiner

METHOD AND SYSTEM FOR USER AUTHENTICATION BASED ON A VISUAL REPRESENTATION OF USER LOCATION

BACKGROUND

Technical Field

The present teaching relates to methods, systems, and programming for user authentication. Particularly, the present teaching is directed to methods, systems, and programming for user authentication based on a visual representation of a location.

Discussion of Technical Background

Nowadays, most applications need to know the identity of a user. Knowing users' identities may allow an application to provide customized experience and authorize them permissions to access their data. The process of proving a user's identity is called user authentication.

During user authentication, most existing techniques try to authenticate a user based on a password input by the user. However, a password based authentication is vulnerable to a Trojan attack. For example, a hacker may steal someone else's password using a key logger Trojan, or any other keyboard capturing methods.

Therefore, there is a need to develop techniques about user authentication to overcome the above drawbacks.

SUMMARY

The present teaching relates to methods, systems, and programming for user authentication. Particularly, the present teaching is directed to methods, systems, and programming for user authentication based on a visual representation of a location.

In one example, a method, implemented on a machine having at least one processor, storage, and a communication platform capable of connecting to a network for user authentication is disclosed. A request is received for authenticating a user with respect to a user identity. A location of the user is determined. A candidate visual representation of the location is obtained from the user. One or more visual representations are retrieved from a database. The retrieved one or more visual representations are associated with the user identity in the database. Whether the user is authenticated is determined based on the candidate visual representation and the retrieved one or more visual representations.

In a different example, a system having at least one processor, storage, and a communication platform connected to a network for user authentication is disclosed. The system includes a request type determiner configured for receiving a request for authenticating a user with respect to a user identity; a user location determiner configured for determining a location of the user; a visual representation analyzer configured for obtaining a candidate visual representation of the location from the user; a visual representation retriever configured for retrieving one or more visual representations from a database, wherein the retrieved one or more visual representations are associated with the user identity in the database; and an authentication determiner configured for determining whether the user is authenticated based on the candidate visual representation and the retrieved one or more visual representations.

Other concepts relate to software for implementing the present teaching on user authentication. A software product, in accord with this concept, includes at least one machine-readable non-transitory medium and information carried by the medium. The information carried by the medium may be executable program code data, parameters in association with the executable program code, and/or information related to a user, a request, content, or information related to a social group, etc.

In one example, a machine-readable, non-transitory and tangible medium having data recorded thereon for user authentication, wherein the medium, when read by the machine, causes the machine to perform the following. A request is received for authenticating a user with respect to a user identity. A location of the user is determined. A candidate visual representation of the location is obtained from the user. One or more visual representations are retrieved from a database. The retrieved one or more visual representations are associated with the user identity in the database. Whether the user is authenticated is determined based on the candidate visual representation and the retrieved one or more visual representations.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
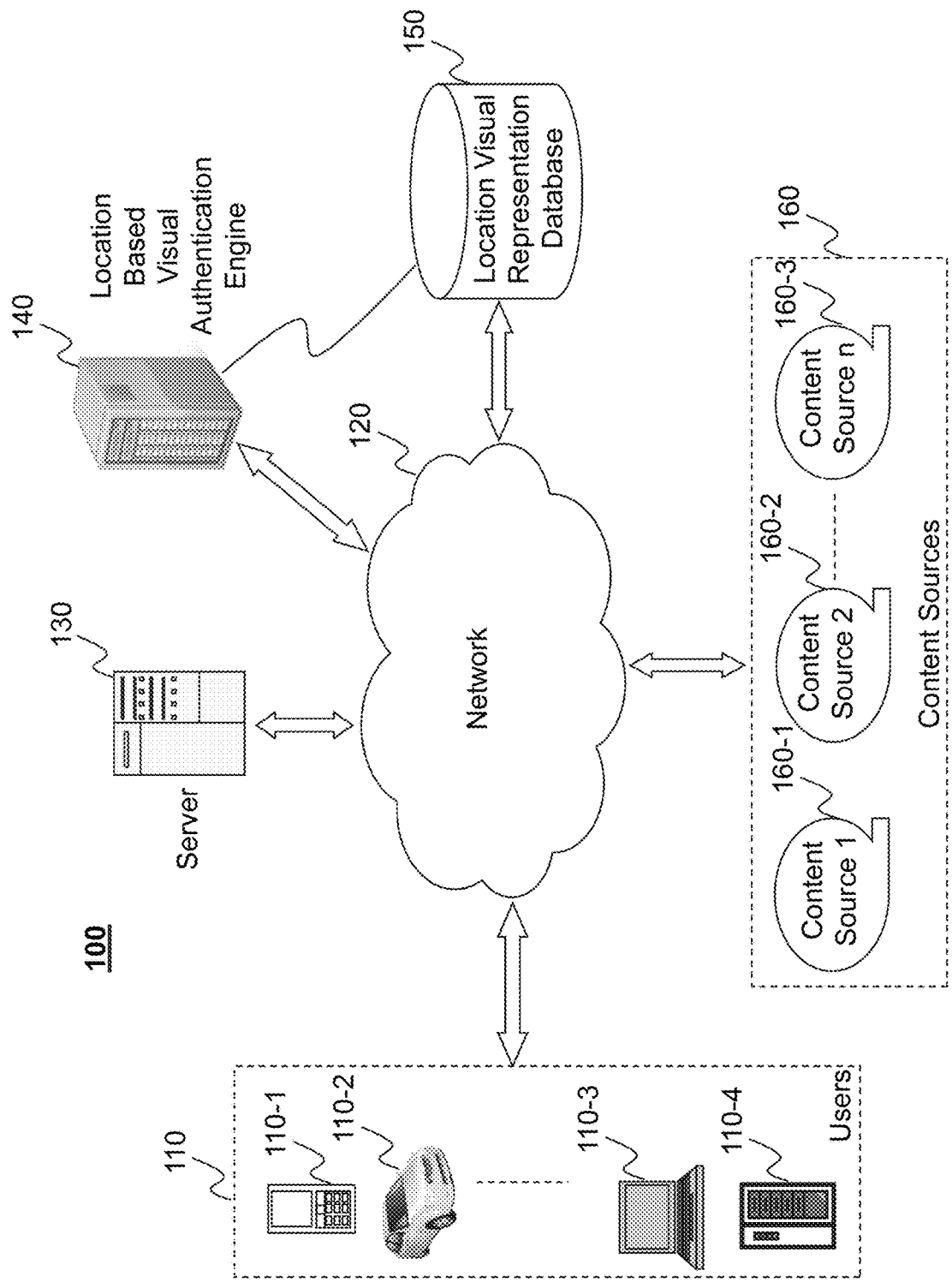
FIG. 1 is a high level depiction of an exemplary networked environment for user authentication based on a visual representation of a location, according to an embodiment of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

The present disclosure describes method, system, and programming aspects of user authentication based on a visual representation of a location, realized as a specialized and networked system by utilizing one or more computing devices (e.g., mobile phone, personal computer, etc.) and network communications (wired or wireless). The method and system as disclosed herein aim at providing user authentication in an effective and efficient manner.

Security is always important to a system that provides data, application, and/or services. To keep the content in the system secured, the system may only authorize a user to access and/or operate on some data in the system if the user is authenticated by the system. During an authentication process, e.g. when a user tries to login a system as user A, the system can verify whether the user is indeed user A, before allowing the user to login. The authentication may depend on some unique information that is a shared secret known only by the system and user A. For example, the system can challenge the user to provide his/her unique information. If the system can verify that the shared secret is presented correctly, the user can be authenticated to login as user A.

Instead of asking a user to provide a password for login, the system in the present teaching performs user authentication based on a visual representation of a location. From the system's point of view, if a user has always been accessing the system from one location but suddenly tries to login from a different location, it is very likely that someone else is trying to login with the user's identity. Accordingly, the system may detect a location of a user who is trying to login with a user identity (ID) and check whether this is a location that has been associated with the user ID. The location of the user may be detected by different techniques, like Internet Protocol (IP) address, Global Positioning System (GPS) location, and/or Access Point (AP) Service Set Identifier (SSID) of wireless signals.

In addition, to prevent a fake location signal, e.g. a fake IP address, the system in the present teaching may request the user to upload a visual representation of the location, e.g. a photo of the location, to prove that the user is indeed at the location. For example, user A may have registered a photo of his/her office at the system, such that the system has associated user A with the office (e.g. a corresponding IP address) and associated the office with the registered photo. In this case, when a user tries to login as user A, the user must have a location detected as user A's office and submit a photo that matches the registered photo, to pass the authentication process.

This authentication process makes it difficult for an attacker to attack, because: first, it is difficult for the attacker to prove to be located at a pre-registered location; second, it is difficult for the attacker to provide a photo that can match a pre-registered photo associated with the pre-registered location.

In one embodiment, the system may request user A to register a photo including both user A and the location, and request a user who tries to login as user A to upload a photo including both the user and the location for login.

In another embodiment, the system may determine whether an uploaded photo is freshly taken, and authenticate the user only if the uploaded photo is freshly taken and matches a pre-registered photo associated with a pre-registered location where the user is determined to be.

In yet another embodiment, the system may not authenticate a user who submits a photo that is exactly the same as a pre-registered photo associated with a pre-registered location where the user is determined to be. This may indicate that the user used a previously taken photo, which is not allowed in this embodiment.

It can be understood that the visual representation of a location may also be in form of videos, infrared images, X-ray images, etc. It can also be understood that a user may register more than one location and register more than one visual representation for each registered location.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

FIG. 1 is a high level depiction of an exemplary networked environment 100 for user authentication based on a visual representation of a location, according to an embodiment of the present teaching. In FIG. 1, the exemplary networked environment 100 includes one or more users 110, a network 120, a server 130, a location based visual authentication engine 140, a location visual representation database 150, and content sources 160. The network 120 may be a single network or a combination of different networks. For example, the network 120 may be a local area network (LAN), a wide area network (WAN), a public network, a private network, a proprietary network, a Public Telephone Switched Network (PSTN), the Internet, a wireless network, a virtual network, or any combination thereof.

Users 110 may be of different types such as users connected to the network 120 via desktop computers 110-4, laptop computers 110-3, a built-in device in a motor vehicle 110-2, or a mobile device 110-1. In one embodiment, users 110 may be connected to the network 120 and able to interact with the server 130 and the location based visual authentication engine 140 through wired or wireless technologies and related operating systems implemented within user-wearable devices (e.g., glasses, wrist watch, etc.). A user, e.g., the user 110-1, may send a request to the server 130, via the network 120, to login a system controlled by the server 130. The user may also receive a response about whether the user is allowed to login from the server 130 through the network 120.

Server 130 may be a server of a service provider that corresponds to an entity, an individual, a firm, or an organization, such as a television station, a newspaper issuer, a web page host, an online service provider, or a game server. The service provider may be an organization such as USPTO.gov, a content provider such as CNN.com and Yahoo.com, or a content-feed source such as tweeter or blogs. In one embodiment, the service provider includes entities that develop, support and/or provide online content via mobile applications (e.g., installed on smartphones, tablet devices, etc.). The service provider may provide content from the content sources 160 based on a request from a user, after the user is authenticated. A content source may correspond to an entity where the content was originally generated and/or stored. The content sources 160 in the exemplary networked environment 100 include multiple content sources 160-1, 160-2 . . . 160-3.

After the server 130 receives a login request from a user, the server 130 may request the user to submit a visual representation of the user's location. The server 130 may then forward the submitted visual representation to the location based visual authentication engine 140. The location based visual authentication engine 140 may determine whether to authenticate this user, based on the submitted visual representation. In particular, the location based visual authentication engine 140 may detect the user's location, retrieve a registered visual representation associated with the location and the user's alleged user ID, e.g. from the location visual representation database 150, and compare the user's submitted visual representation with the registered visual representation. The location based visual authentication engine 140 may authenticate the user if the user's submitted visual representation matches the registered visual representation.

In another case, after a user is authenticated, e.g. as user X, the user may register a visual representation of a location in association with user X, for future login. For example, this may be the first time for the user to register a photo after the user logs in with a password. In another example, the user may want to register a new photo in association with a new location that has not previously been registered in the system. In either example, the location based visual authentication engine 140 may receive the request and the visual representation to be registered, either from the server 130 or directly from the location based visual authentication engine 140. After determining the user's ID, location and obtaining the visual representation, the location based visual authentication engine 140 may register the visual representation and store the visual representation in the location visual representation database 150, in association with the user ID and the user location.

The location visual representation database 150 may store visual representations of different locations associated with different users. In one embodiment, the location based visual authentication engine 140 may generate a template based on each submitted visual representation, e.g. by normalization, environmental information extraction, etc. Then, the location visual representation database 150 may store visual representation templates of different locations associated with different users. When a user submits a photo to login, the location based visual authentication engine 140 may also generate a photo template based on the submitted photo, e.g. by normalization and environmental information extraction, and then compare the generated photo template with stored photo templates associated with a detected location of the user to determine whether the user should be authenticated. In another embodiment, the location visual representation database 150 may store the raw visual representations of different locations associated with different users. When a user submits a photo to login, the location based visual authentication engine 140 may retrieve the raw photo corresponding to a detected location of the user, generate a template for each of the submitted photo and the retrieved raw photo, and then compare the two templates to determine whether the user should be authenticated.

Figure 2:
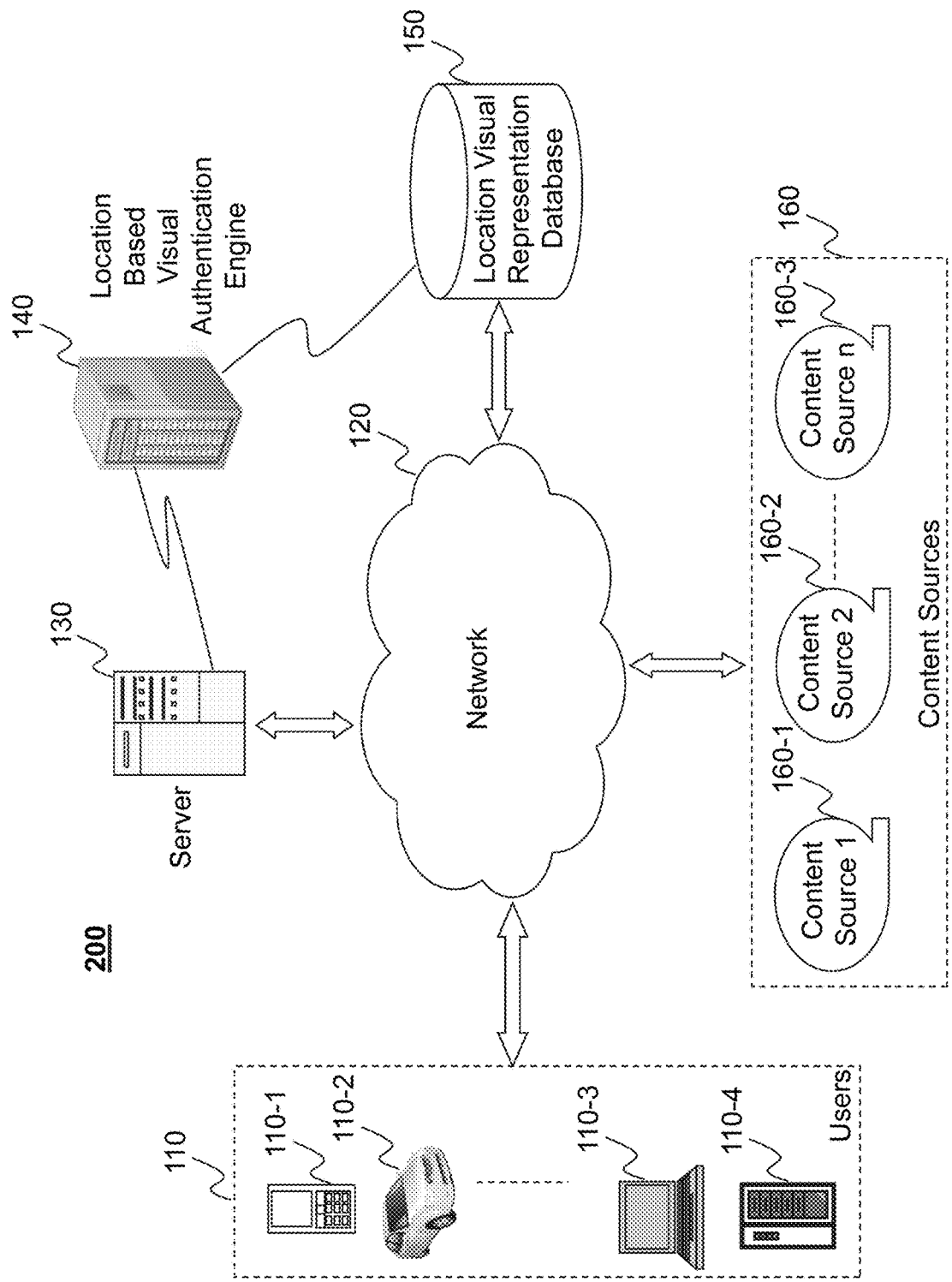
FIG. 2 is a high level depiction of another exemplary networked environment for user authentication based on a visual representation of a location, according to an embodiment of the present teaching.

FIG. 2 is a high level depiction of another exemplary networked environment 200 for user authentication based on a visual representation of a location, according to an embodiment of the present teaching. The exemplary networked environment 200 in this embodiment is similar to the exemplary networked environment 100 in FIG. 1, except that the location based visual authentication engine 140 serves as a backend system for the server 130.

Figure 3:
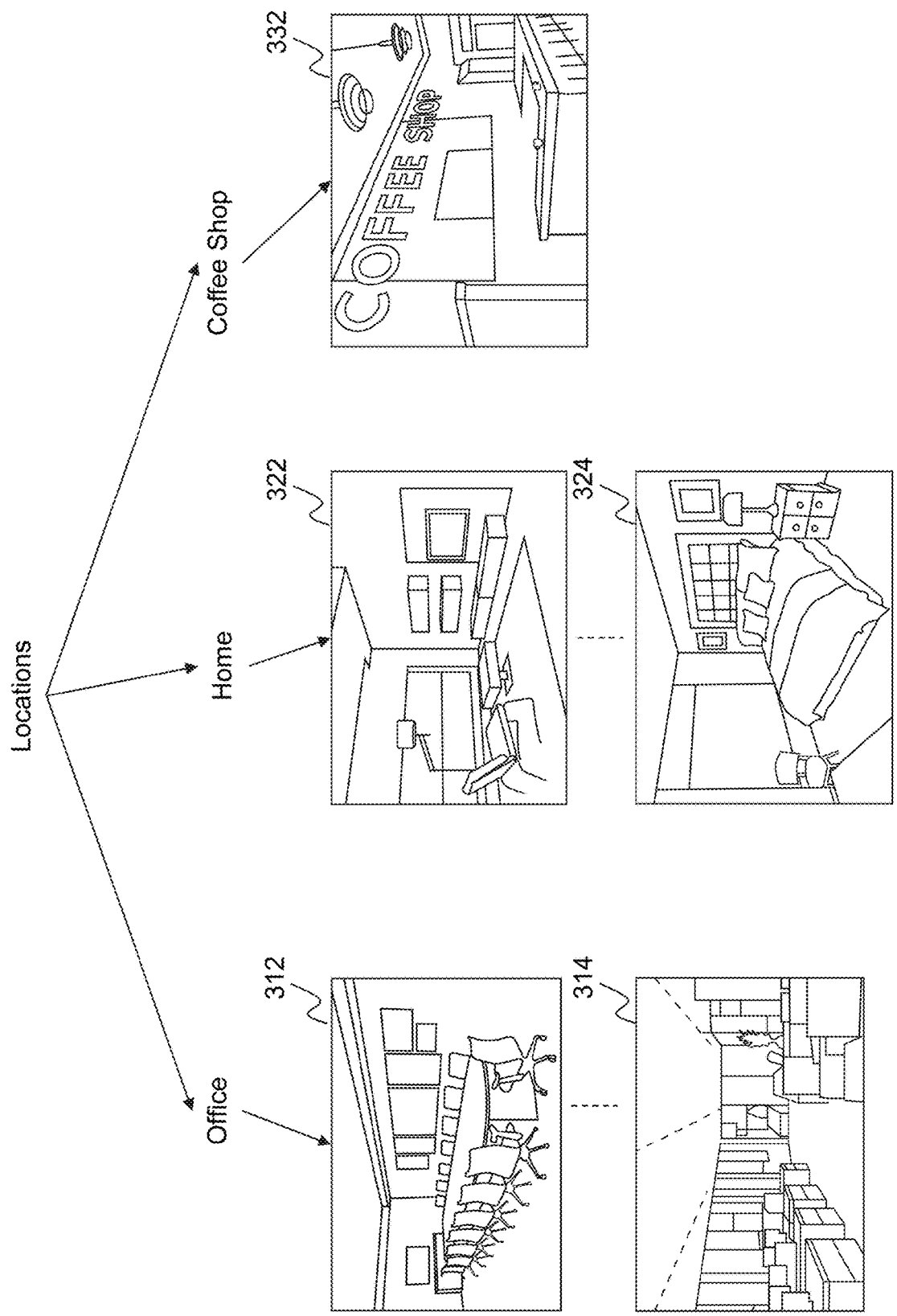
FIG. 3 illustrates exemplary photos associated with different locations, according to an embodiment of the present teaching.

FIG. 3 illustrates exemplary photos associated with different locations, according to an embodiment of the present teaching. For example, photos 312, 314 are associated with an office of a user; photos 322, 324 are associated with the user's home; and photo 332 is associated with a coffee shop from where the user may login the system. In one example, a user may only have photos associated with one location. In another example, a user may have photos associated with other locations, e.g. a park, a bus stop, etc.

As shown in FIG. 3, each photo may include some entities that are almost fixed and some entities that are movable. For example, photo 312 is a visual representation of an office, where the table may be fixed and the chairs are movable. Therefore, when the system compares a newly submitted photo with the photo 312, the system may take into consideration of the movable chairs when determining whether the two photos match each other.

Figure 4:
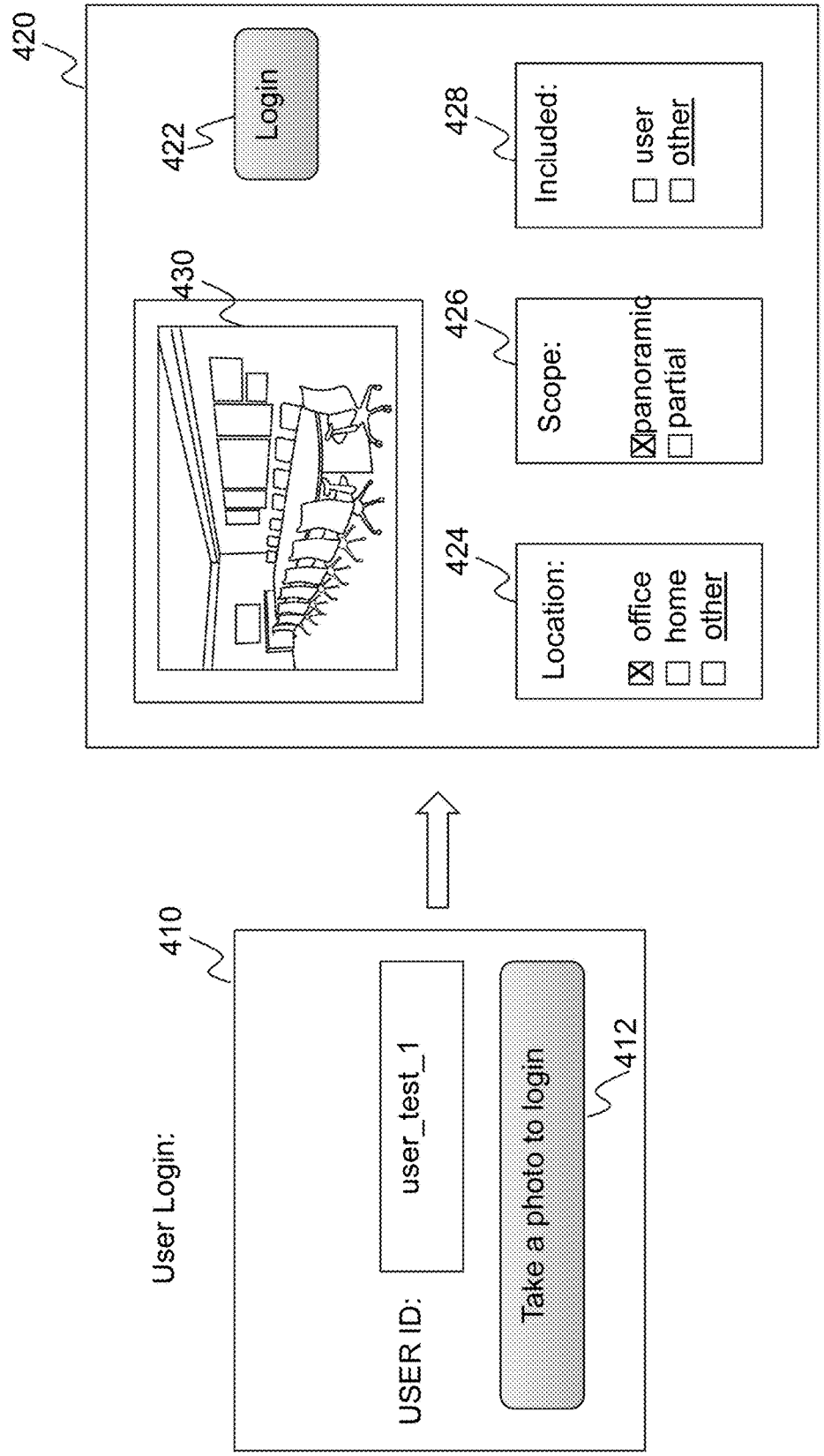
FIG. 4 illustrates exemplary user interfaces, when a user tries to login by taking and submitting a photo, according to an embodiment of the present teaching.

FIG. 4 illustrates exemplary user interfaces, when a user tries to login by taking and submitting a photo, according to an embodiment of the present teaching. As shown in FIG. 4, at user interface 410, a user is trying to login with a user ID: user_test_1. After the user clicking the button "Take a photo to login" 412, the system directs the user to another user interface 420.

In this example, the user submits the photo 430 at the user interface 420. In addition, the user indicates that the photo 430 is a visual representation of his/her office at the location box 424. As such, after the user clicks on the button "Login" 422, the system will compare the photo 430 with a registered photo associated with the office of user_test_1 to determine whether the user should be authenticated. In other examples, a user may submit a photo associated with the user's home or other locations input by the user at the location box 424.

The user also indicates that the scope 426 of the submitted photo 430 is panoramic. A photo may be panoramic or partial. In one case, if both the submitted photo and the registered photo are of the same type, i.e. both panoramic or both partial, they can be compared directly. In another case, if the submitted photo and the registered photo are of the different types, i.e. one is panoramic and one is partial, the system may either reject the login for security or determine whether the partial photo matches a portion of the panoramic photo to determine whether the user should be authenticated.

The user in this example indicates that the submitted photo 430 does not include the user itself. In other examples, a user may submit a photo that includes the user itself or other entities input by the user at the box 428. If so, the system may retrieve a stored photo that includes the same entity for comparison and user authentication.

Figure 5:
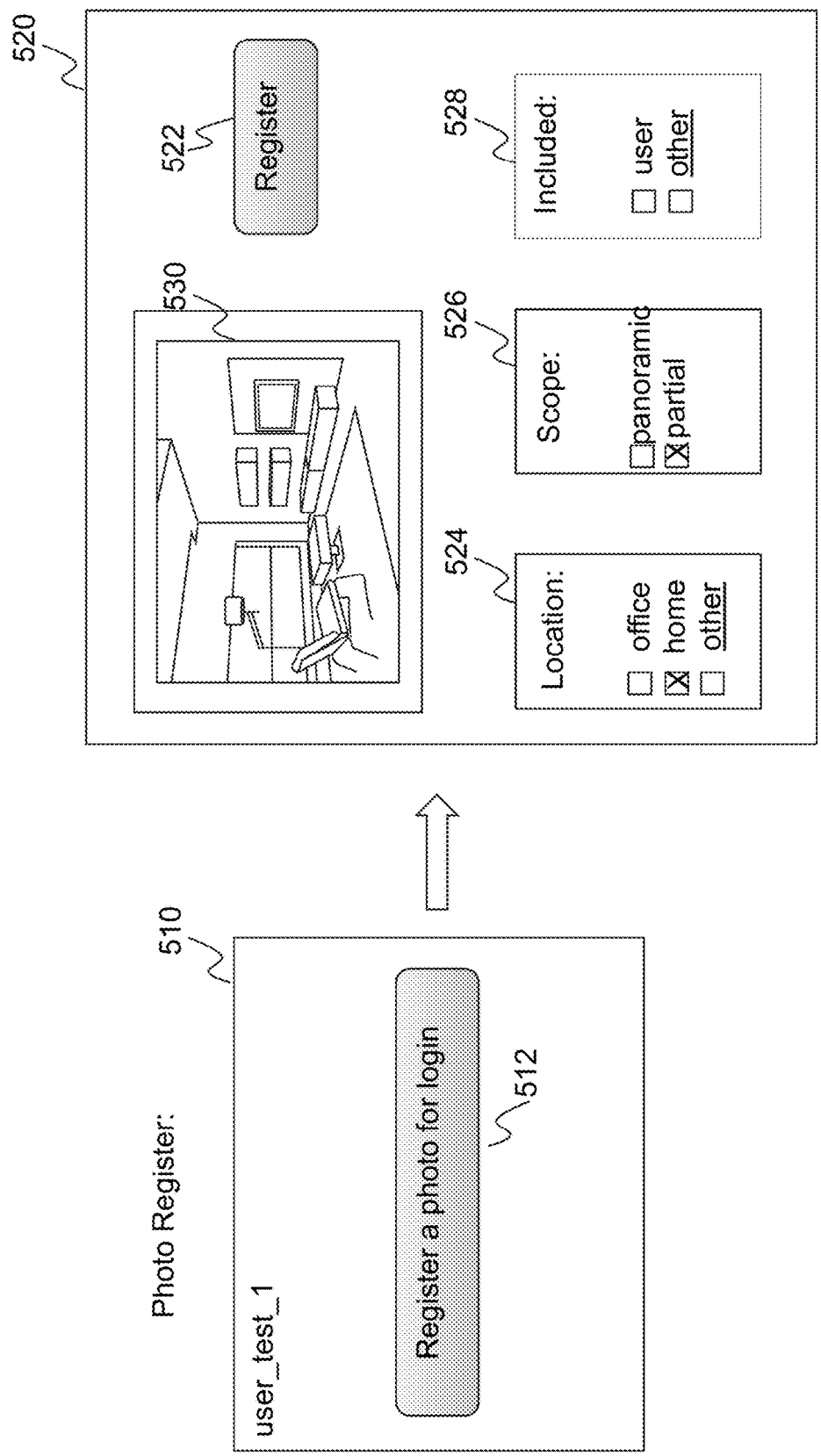
FIG. 5 illustrates exemplary user interfaces, when an authenticated user registers a new photo for future login, according to an embodiment of the present teaching.

FIG. 5 illustrates exemplary user interfaces, when an authenticated user registers a new photo for future login, according to an embodiment of the present teaching. As shown in FIG. 5, after user_test_1 is authenticated, the user may register a new photo by clicking the button "Register a photo for login" 512 at user interface 510. After the user clicking the button "Register a photo for login" 512, the system directs the user to another user interface 520.

In this example, the user submits the photo 530 at the user interface 520. In addition, the user indicates that the photo 530 is a visual representation of his/her home at the location box 524. As such, after the user clicks on the button "Register" 522, the system will register the photo 530 by storing the photo 530 in association with the home of user_test_1. In other examples, a user may register a photo associated with the user's office or other locations input by the user at the location box 524.

The user also indicates that the scope 526 of the submitted photo 530 is partial and that the submitted photo 530 does not include the user itself. In other examples, a user may register a photo that includes the user itself or other entities input by the user at the box 528. If so, the system may store the registered photo with some metadata indicating that the photo includes the user itself or other entities.

Figure 6:
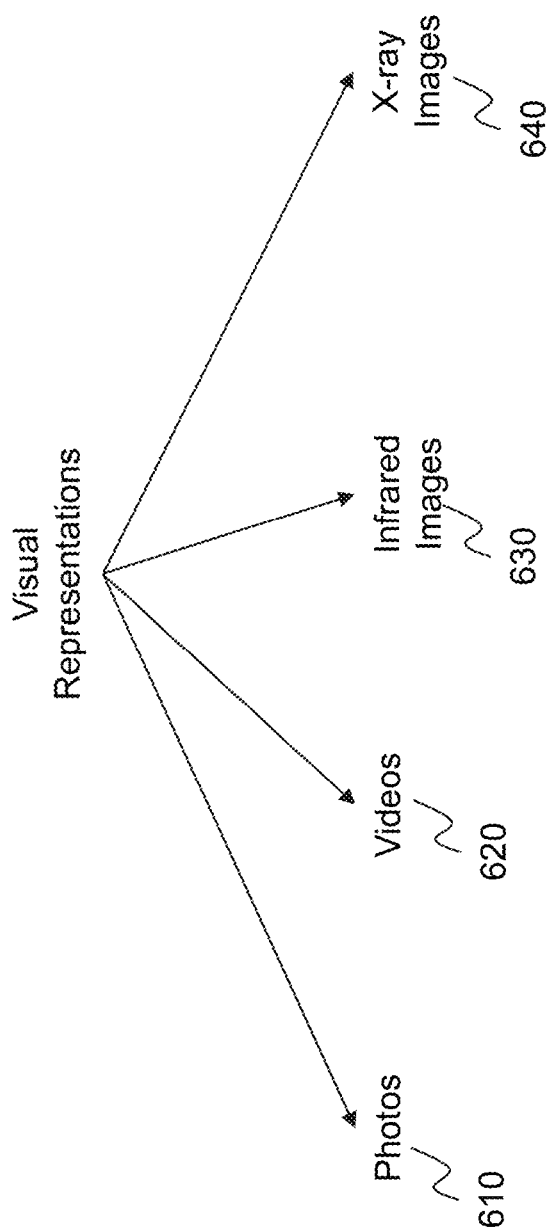
FIG. 6 illustrates exemplary visual representations that may be used for user login in association with user location, according to an embodiment of the present teaching.

FIG. 6 illustrates exemplary visual representations that may be used for user login in association with user location, according to an embodiment of the present teaching. For example, a visual representation of a location may be of different types: a photo 610 of the location, a video 620 of the location, an infrared image 630 of the location, an X-ray image 640 of the location, etc. During user authentication, the system matches a user submitted visual representation of a type with one or more retrieved visual representations of the same type to determine whether the use should be authenticated. In one embodiment, the system may request a user trying to login to submit a visual representation of a specific type. In another embodiment, the system may request a user trying to login to submit multiple visual representations of different types for user authentication.

Figure 7:
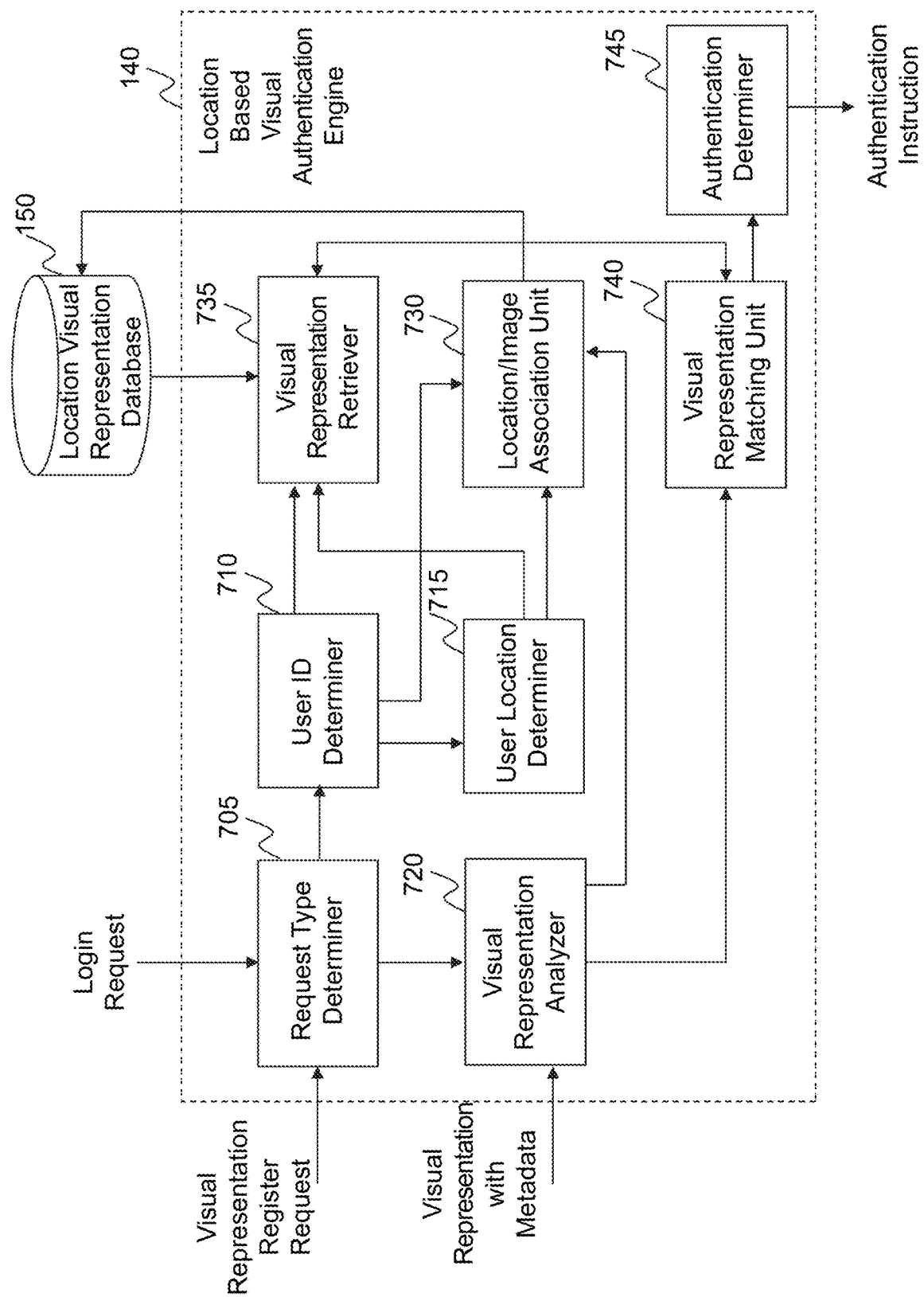
FIG. 7 illustrates an exemplary diagram of a location based visual authentication engine, according to an embodiment of the present teaching.

FIG. 7 illustrates an exemplary diagram of a location based visual authentication engine 140, according to an embodiment of the present teaching. The location based visual authentication engine 140 in this example includes a request type determiner 705, a user ID determiner 710, a user location determiner 715, a visual representation analyzer 720, a location/image association unit 730, a visual representation retriever 735, a visual representation matching unit 740, and an authentication determiner 745.

The request type determiner 705 in this example receives a request either from the server 130 or directly from a user. This may be a request for visual representation register from an authenticated user, or a request for login. The request type determiner 705 can determine a type of the request, i.e. a login request or a visual representation register request. The request type determiner 705 may send information related to the request, including the request type, to the user ID determiner 710 for determining a user ID and to the visual representation analyzer 720 for analyzing a visual representation submitted by the user.

The user ID determiner 710 in this example can determine a user ID associated with the user. If the request is for login, the user ID determiner 710 may determine the user ID based on the user's input. In this case, the user ID determiner 710 may send the user ID to the location/image association unit 730 for associating location with visual representation. If the request is for visual representation register, the user ID determiner 710 may determine the user ID based on information forwarded by the server 130. In this case, the user ID determiner 710 may send the user ID to the visual representation retriever 735 for retrieving visual representation(s) for user authentication. In either case, the user ID determiner 710 can send the user ID to the user location determiner 715 for determining the user's location.

The visual representation analyzer 720 in this example may receive a visual representation submitted by the user along with some metadata, either from the server 130 or directly from the user. As discussed before, the visual representation may be a photo, a video, an infrared image, an X-ray image, etc. The visual representation analyzer 720 may analyze the submitted visual representation based on the type of the request. If the request is for login, the submitted visual representation is alleged to represent the user's current location. If the request is for visual representation register, the submitted visual representation is supposed to represent a location related to the user. That is, an authenticated user may register a photo of his/her current location or a location that is associated with the user and can be identified by the system, e.g. via IP address, GPS, or AP SSID.

The metadata received by the visual representation analyzer 720 may include information input by the user in association with the visual representation. For example, the metadata may include the location information and the scope of the visual representation, and what is included in the visual representation, as shown in FIG. 4 or FIG. 5.

The analysis of the visual representation may include normalization, entity detection, entity layout detection, environmental information extraction, etc. After the analysis, the visual representation analyzer 720 can generate a visual representation template. If the request is for login, the visual representation analyzer 720 may send the visual representation template to the visual representation matching unit 740 for matching with stored visual representations for user authentication. If the request is for visual representation register, the visual representation analyzer 720 may send the visual representation template to the location/image association unit 730 for associating location with the visual representation template. In one embodiment, the visual representation analyzer 720 does not analyze the visual representation before registering the visual representation, but will analyze it if it is retrieved later for matching with a newly submitted visual representation.

The user location determiner 715 in this example determines a location of the user, based on e.g. IP address, GPS, or AP SSID. This location can be used as a location ID by the system to index and sort out data in the location visual representation database 150. This may be different from the location information input by the user like office, home, etc. as shown in FIG. 4 or FIG. 5. If the request is for login, the user location determiner 715 may send the location to the visual representation retriever 735 for retrieving visual representation(s) associated with the location for user authentication. If the request is for visual representation register, the user location determiner 715 may send the location to the location/image association unit 730 for associating the location with the visual representation.

The location/image association unit 730 in this example receives the user ID from the user ID determiner 710, receives the user location from the user location determiner 715, and receives the submitted visual representation from the visual representation analyzer 720. In one embodiment, the location/image association unit 730 receives a visual representation template from the visual representation analyzer 720 to be registered in association with the user ID and the location. The location/image association unit 730 may store the visual representation template in the location visual representation database 150 in association with the user ID and the location, for future login of the user. In another embodiment, the system allows the authenticated user to register a visual representation of a location that is different from the user's current location. For example, a user may have a photo registered for his office and another photo registered for his home in the database. Now the user is located at his home, but wants to register a new photo for his office. The user may be allowed to do so by submitting a new photo and indicating that the new photo is to be registered with his office, since the system has already known the location ID of his office, by e.g. his office's IP address, GPS, or AP SSID.

The visual representation retriever 735 in this example receives the user ID from the user ID determiner 710, receives the user location from the user location determiner 715, and receives a retrieval request from the visual representation matching unit 740. Based on the retrieval request, the visual representation retriever 735 may retrieve one or more visual representations of the user location associated with the user ID, from the location visual representation database 150. The visual representation retriever 735 can send the retrieved one or more visual representations to the visual representation matching unit 740 for matching.

The visual representation matching unit 740 in this example receives the submitted visual representation (maybe in form of a visual representation template generated by the visual representation analyzer 720) and compares the submitted visual representation with the retrieved one or more visual representations. The visual representation matching unit 740 can determine whether there is a match between the submitted visual representation and any of the retrieved one or more visual representations. The visual representation matching unit 740 can generate a matching result and send it to the authentication determiner 745.

The authentication determiner 745 can determine whether the user should be authenticated based on the matching result. The authentication determiner 745 can generate and send an authentication instruction to the server 130. The authentication instruction may instruct the server 130 to allow the user to login if the submitted visual representation matches one of the retrieved one or more visual representations. The authentication instruction may instruct the server 130 not to allow the user to login if the submitted visual representation does not match any of the retrieved one or more visual representations.

Figure 8:
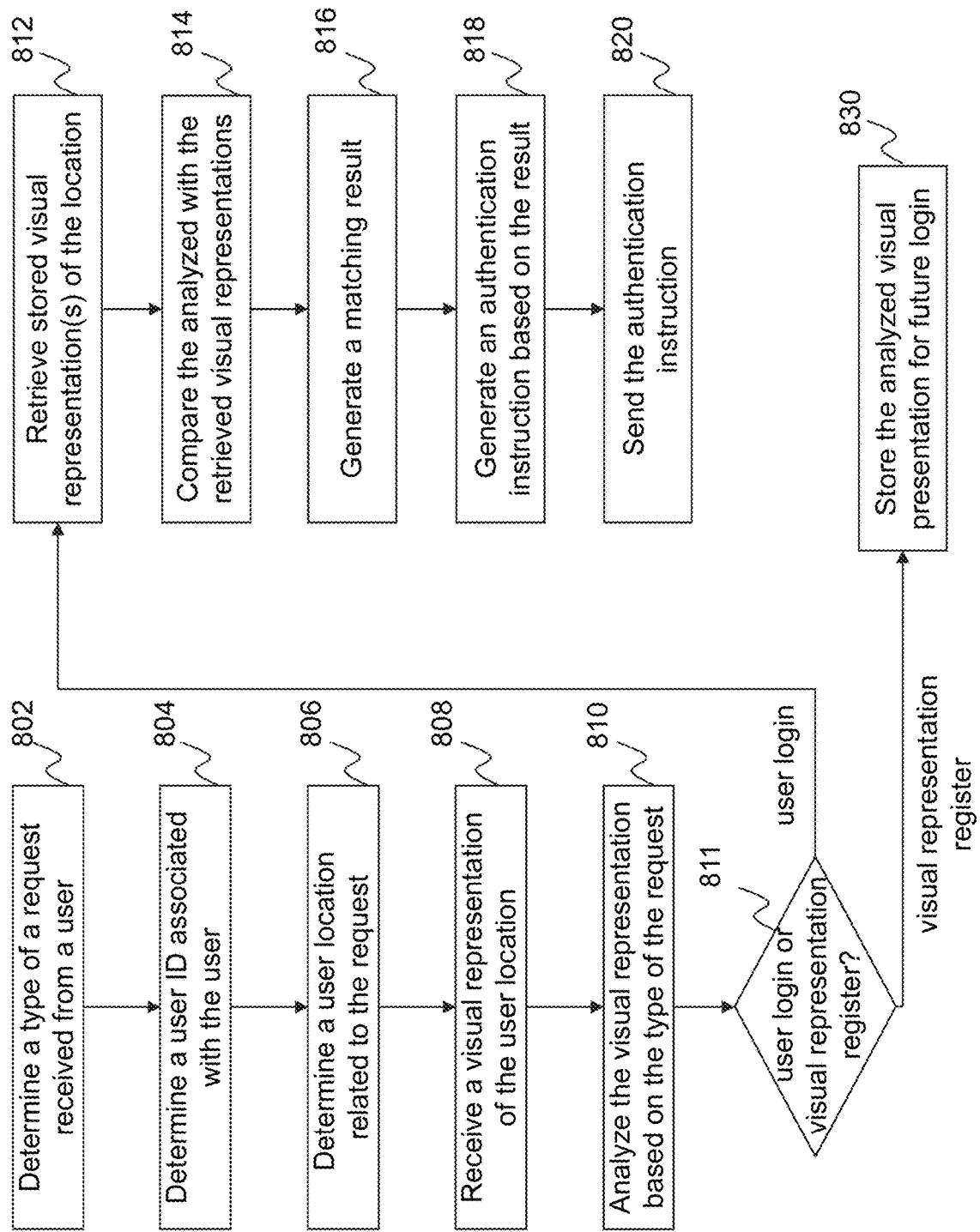
FIG. 8 is a flowchart of an exemplary process performed by a location based visual authentication engine, according to an embodiment of the present teaching.

FIG. 8 is a flowchart of an exemplary process performed by a location based visual authentication engine, e.g. the location based visual authentication engine 140 in FIG. 7, according to an embodiment of the present teaching. At 802, a type of a received request is determined. The request may be submitted by a user. A user ID associated with the user is determined at 804. A user location related to the request is determined at 806. The user location may be detected from the user's current location. At 808, a (alleged) visual representation of the user location is received. The visual representation is analyzed at 810 based on the type of the request.

At 811, it is determined whether the request is for user login or for visual representation register. If the request is for visual representation register, the process goes to 830, where the analyzed visual representation is stored associated with the location and the user ID, for future login. If the request is for user login, the process goes to 812, where the stored one or more visual representations associated with the location and the user ID are retrieved.

At 814, the analyzed visual representation and the retrieved one or more visual representations are compared. At 816, a matching result is generated. An authentication instruction is generated at 818 based on the matching result and sent to the server 130 at 820.

It can be understood that the order of the steps shown in FIG. 8 may be changed according to different embodiments of the present teaching.

Figure 9:
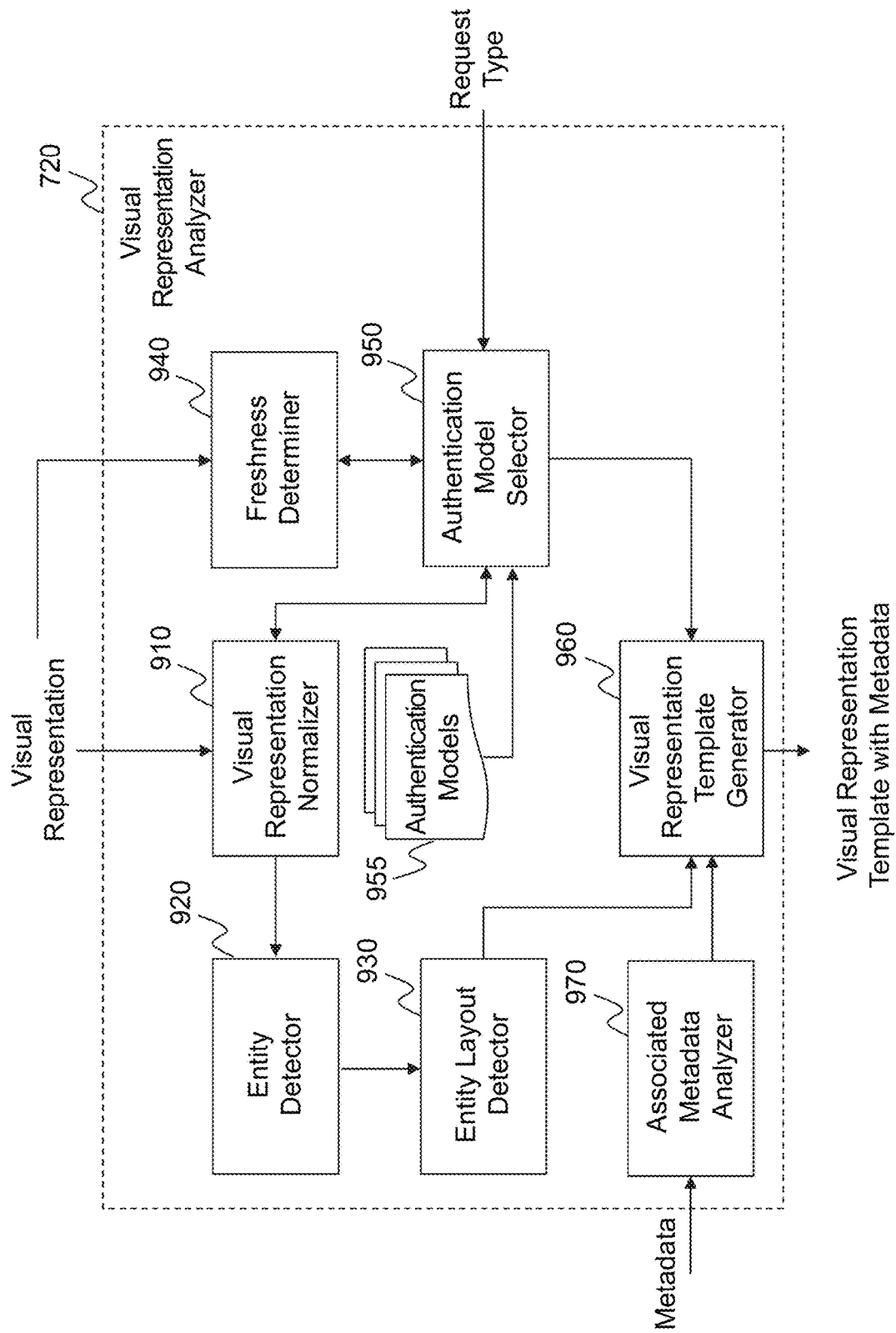
FIG. 9 illustrates an exemplary diagram of a visual representation analyzer, according to an embodiment of the present teaching.

FIG. 9 illustrates an exemplary diagram of a visual representation analyzer 720, according to an embodiment of the present teaching. The visual representation analyzer 720 in this example includes a visual representation normalizer 910, an entity detector 920, an entity layout detector 930, a freshness determiner 940, an authentication model selector 950, one or more authentication models 955, a visual representation template generator 960, and an associated metadata analyzer 970.

The visual representation normalizer 910 in this example receives a visual representation associated with a request. The request may be for user login or for visual representation register. The visual representation normalizer 910 may normalize the visual representation to generate a normalized visual representation. For example, for a submitted photo, the visual representation normalizer 910 may normalize its grey scales, geometric shape, etc. The visual representation normalizer 910 may send the normalized visual representation to the entity detector 920.

In one embodiment, the normalization at the visual representation normalizer 910 may also include extracting environmental information from the visual representation. The environmental information may indicate that whether the visual representation is taken during day or during night, in which season, etc. The visual representation normalizer 910 may send the extracted environmental information to the authentication model selector 950 for user authentication.

The entity detector 920 in this example detects entities in the visual representation. For example, for a submitted photo, the entities may include furniture, people and other objects in the photo. These entities may be utilized for determining whether there is a match between two photos during user authentication. In one example, the system may determine there is a match when at least 90% of the detected entities in a retrieved photo also exist in the submitted photo. In another example, the system may determine there is a match when all of the fixed entities in a retrieved photo also exist in the submitted photo. The fixed entities of a photo, e.g. a photo of a bedroom, may include a bed, a nightstand, a dresser with mirror and a chest of drawers. The entity detector 920 can send the information of the detected entities to the entity layout detector 930.

The entity layout detector 930 in this example detects entity layout in the visual representation. For example, for a submitted photo, the entity layout detector 930 may determine the relative locations of the entities in the photo. The entity layout may also be utilized for determining whether there is a match between two photos during user authentication. For example, the system may determine there is a match when all of the fixed entities in a retrieved photo also exist in the submitted photo with the same relative locations. For example, for two photos of a bedroom, they can be determined to match each other if they both include a bed, a nightstand, a dresser with mirror and a chest of drawers that are distributed with a same layout. The entity layout detector 930 may send the information detected from the visual representation to the visual representation template generator 960 for generating a visual representation template.

The authentication model selector 950 in this example receives a request type from the request type determiner 705. The request type indicates whether the request is for user login or for visual representation register. The authentication model selector 950 can select one of the authentication models 955, based on the request type. An authentication model determines how to authenticate a user based on a visual representation. For example, an authentication model may indicate which type of visual representation should be used for authentication, a photo, a video, or an infrared image. An authentication model may also indicate whether to check a freshness of a submitted visual representation. An authentication model may also indicate whether to utilize environmental information for user authentication.

If the authentication model selected by the authentication model selector 950 indicates to check a freshness of the submitted visual representation, the authentication model selector 950 may instruct the freshness determiner 940 to do so. The freshness determiner 940 in this example determines the time when the visual representation was taken, and determines whether the visual representation was freshly taken. The freshness determiner 940 may send the freshness information to the authentication model selector 950. The authentication model selector 950 may then send the freshness information to the visual representation template generator 960.

If the authentication model selected by the authentication model selector 950 indicates to utilize environmental information for user authentication, the authentication model selector 950 may instruct the visual representation normalizer 910 to do so. The visual representation normalizer 910 in this example extracts the environmental information from the visual representation. The visual representation normalizer 910 may send the environmental information to the authentication model selector 950. The authentication model selector 950 may then send the environmental information to the visual representation template generator 960.

The visual representation template generator 960 in this example receives detected information in the visual representation from the entity layout detector 930, and generates a visual representation template accordingly. The visual representation template may include basic information of the visual representation, like included entities, entity layout, etc. The visual representation template generator 960 may also receive the authentication model with some metadata from the authentication model selector 950. The metadata may include the freshness information and/or the environmental information. The visual representation template generator 960 may also receive the associated metadata from the associated metadata analyzer 970. The associated metadata analyzer 970 in this example receives metadata input by the user in association with the visual representation, e.g. the information input by the user in FIG. 4 and FIG. 5. The associated metadata analyzer 970 may analyze and send the input metadata to the visual representation template generator 960. The visual representation template generator 960 can aggregate the input metadata with the metadata received from the authentication model selector 950. The visual representation template generator 960 can send the generated visual representation template with the aggregated metadata, either to the location/image association unit 730 for visual representation register or to the visual representation matching unit 740 for user authentication.

Figure 10:
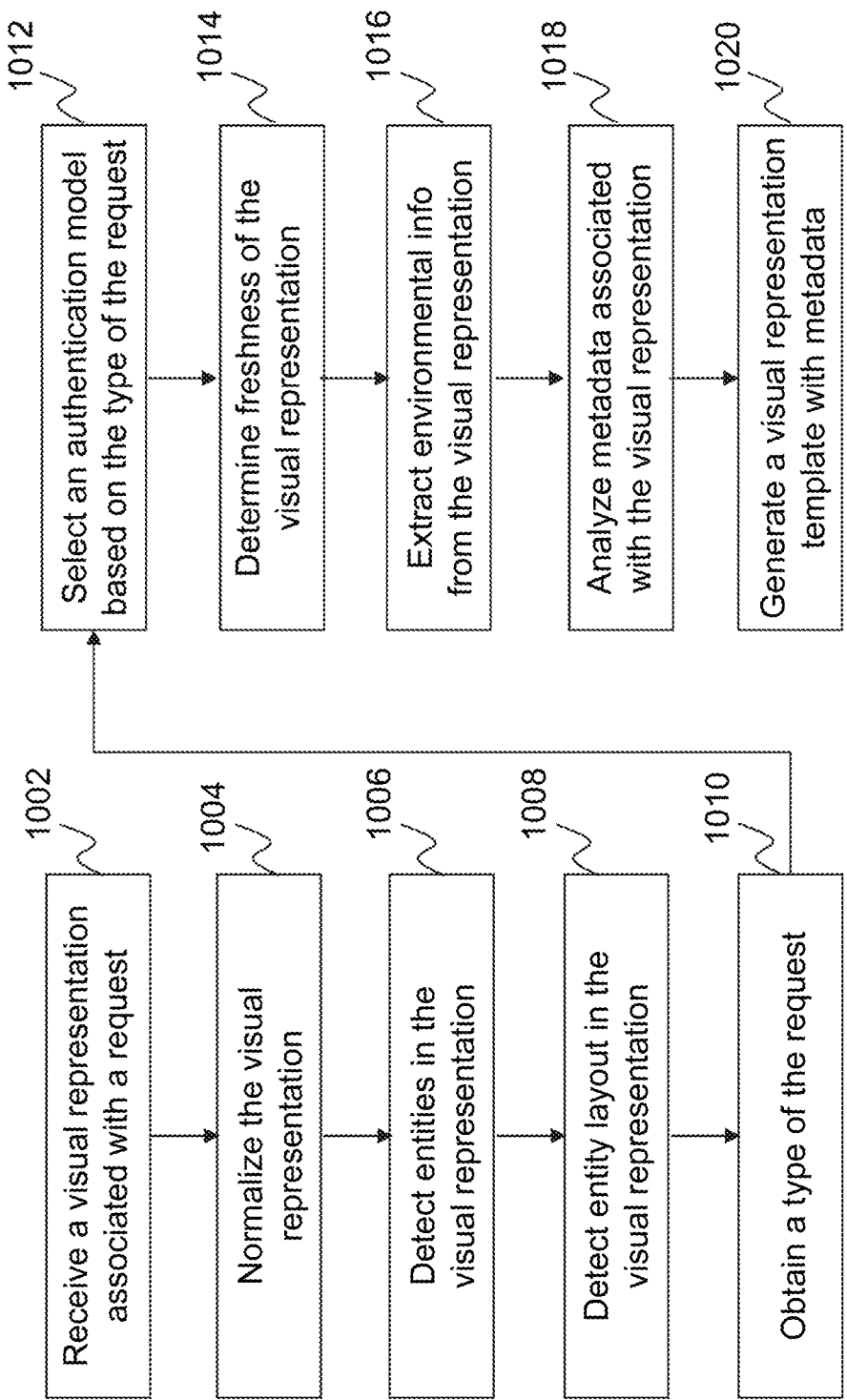
FIG. 10 is a flowchart of an exemplary process performed by a visual representation analyzer, according to an embodiment of the present teaching.

FIG. 10 is a flowchart of an exemplary process performed by a visual representation analyzer, e.g. the visual representation analyzer 720 in FIG. 9, according to an embodiment of the present teaching. At 1002, a visual representation associated with a request is received. The visual representation is normalized at 1004. One or more entities are detected at 1006 from the visual representation. An entity layout in the visual representation is detected at 1008.

At 1010, a type of the request is obtained. An authentication model is selected at 1012 based on the type of the request. At 1014, freshness of the visual representation is determined. At 1016, environmental information is extracted from the visual representation. Metadata associated with the visual representation is analyzed at 1018. A visual representation template is generated with aggregated metadata at 1020.

It can be understood that the order of the steps shown in FIG. 10 may be changed according to different embodiments of the present teaching.

Figure 11:
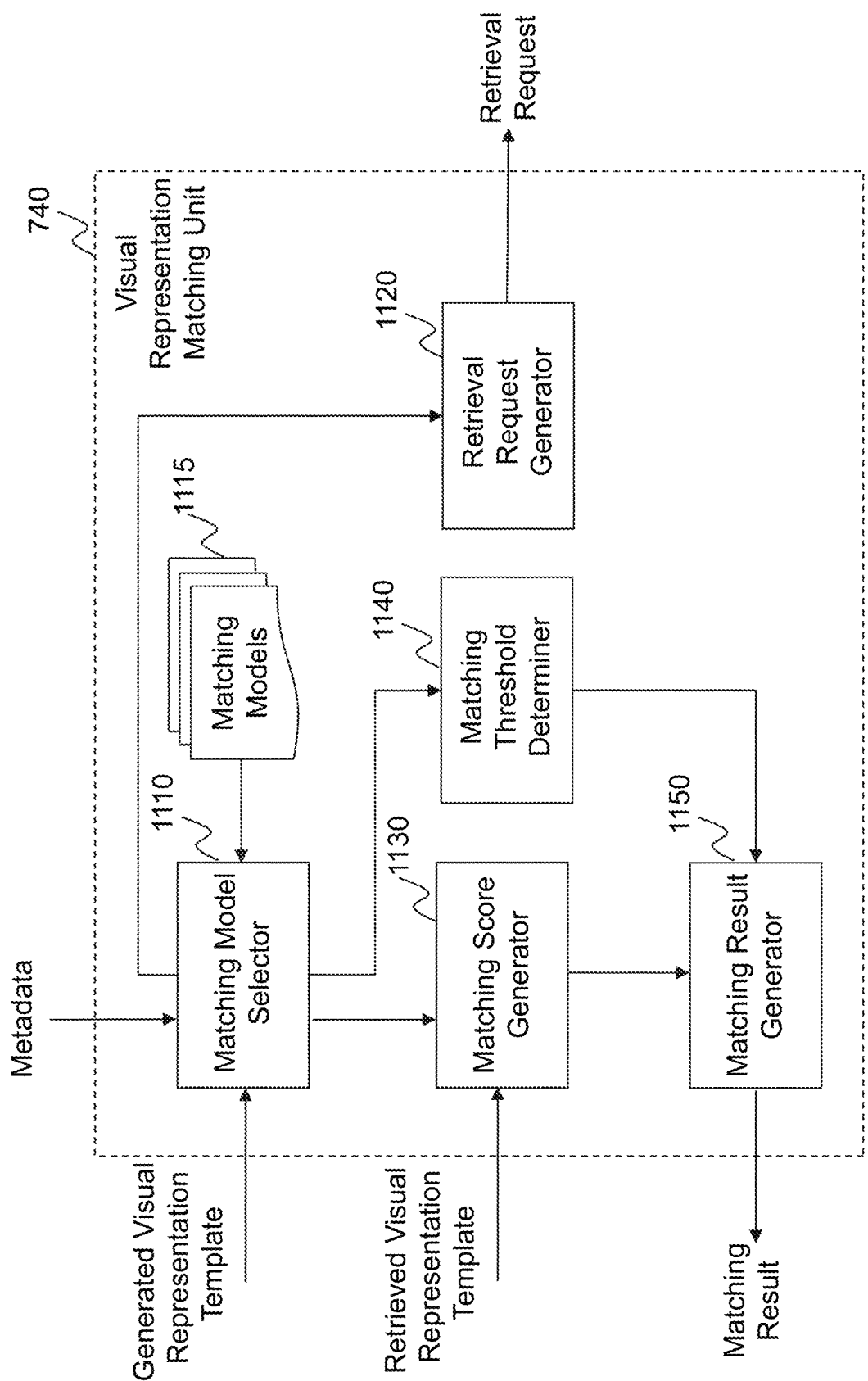
FIG. 11 illustrates an exemplary diagram of a visual representation matching unit, according to an embodiment of the present teaching.

FIG. 11 illustrates an exemplary diagram of a visual representation matching unit 740, according to an embodiment of the present teaching. The visual representation matching unit 740 in this example includes a matching model selector 1110, one or more matching models 1115, a retrieval request generator 1120, a matching score generator 1130, a matching threshold determiner 1140, and a matching result generator 1150.

The matching model selector 1110 in this example receives a generated visual representation template and metadata from the visual representation analyzer 720. The matching model selector 1110 may select one of the matching models 1115 for matching the generated visual representation template with stored visual representation template(s). A matching model may indicate what to compare between two visual representation templates. For example, to compare a submitted photo with a stored photo, a matching model may indicate to compare entities in the two photos, to compare entity layout in the two photos, and/or to compare environmental information in the two photos. A matching model may also indicate to compare a freshness of a submitted photo with a threshold. For example, a submitted photo needs to be taken within ten minutes to be qualified for user authentication. A matching model may also indicate to compare environmental information of a submitted photo with context information. For example, if a user submits a photo for login during the day, a photo including a bright moon in the sky cannot be qualified for user authentication. The matching model selector 1110 may send the selected matching model to the retrieval request generator 1120, the matching score generator 1130 and the matching threshold determiner 1140.

The retrieval request generator 1120 in this example can generate and send a retrieval request to the visual representation retriever 735. The matching score generator 1130 in this example can receive the visual representation template(s) retrieved by the visual representation retriever 735. The matching score generator 1130 can match the generated visual representation template with each of the one or more retrieved visual representation templates to generate a matching score. The matching score may indicate a degree of similarity between the two visual representations.

In one embodiment, the matching at the matching score generator 1130 may include multiple comparisons between the two visual representations, e.g. comparisons of the entities, the entity layout, environmental information etc. In this case, the matching score may be an aggregated score generated based on all of these comparisons.

In another embodiment, the metadata associated with the two visual representation templates include all extracted information from the original visual representations. Therefore, the matching score generator 1130 can essentially compare two visual representations in their original format. The generated matching score can thus indicate whether these two visual representations are actually two copies of the same visual representation.

The matching threshold determiner 1140 in this example can determine one or more matching thresholds and send them to the matching result generator 1150 for generating a matching result. The one or more matching thresholds may be determined based on the matching model selected by the matching model selector 1110.

The matching result generator 1150 in this example may generate a matching result based on the matching scores from the matching score generator 1130 and the one or more matching thresholds from the matching threshold determiner 1140. The matching result may indicate whether there is a match between the submitted visual representation and any one of the retrieved visual representations based on the corresponding matching score. In one example, the matching result indicates there is a match when the corresponding matching score exceeds the matching threshold. In another example, the matching result indicates there is a match when the corresponding matching score is greater than a first matching threshold and less than a second matching threshold. This may happen when the matching score can indicate whether these two visual representations are actually two copies of the same visual representation. To avoid a user using a previously taken visual representation to login, the matching result generator 1150 may screen out the exact same matches. The matching result generator 1150 can send the matching result to the authentication determiner 745 for user authentication.

Figure 12:
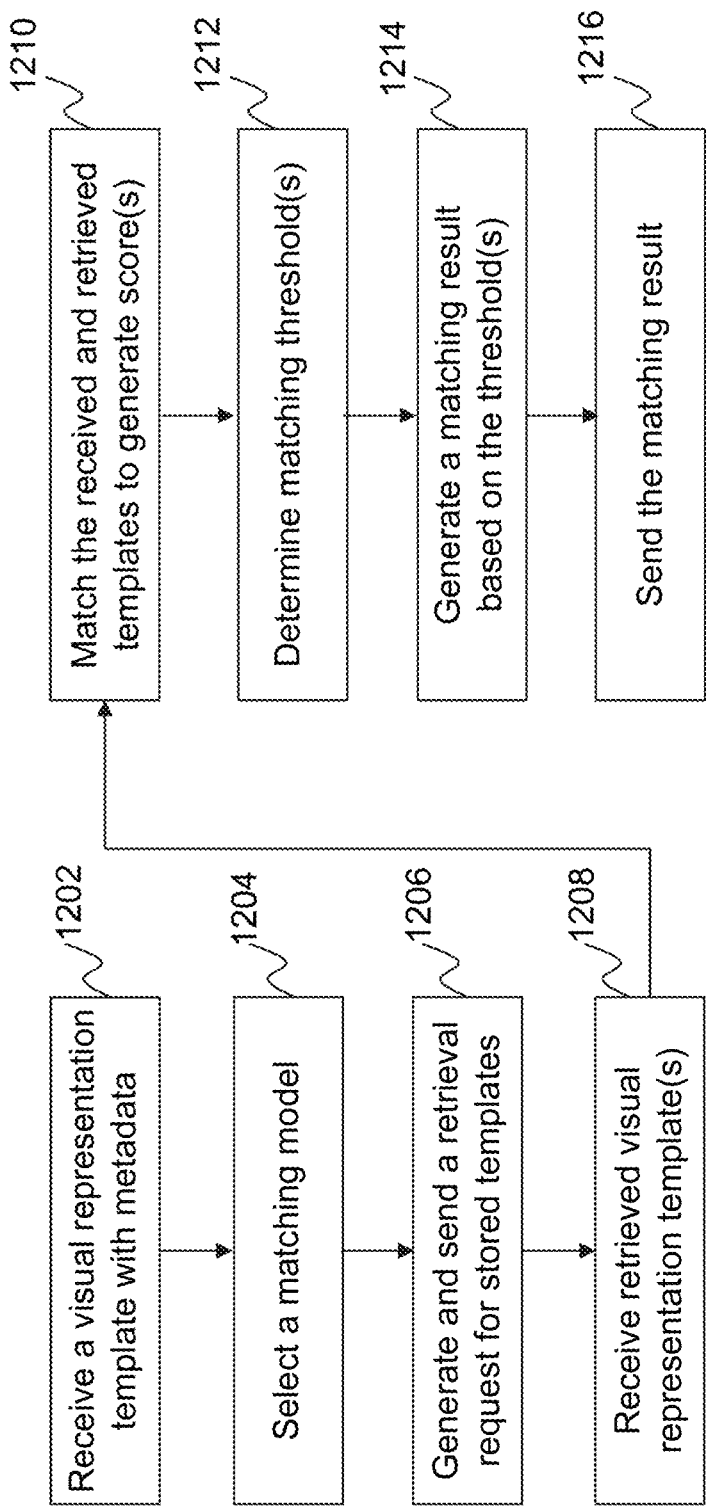
FIG. 12 is a flowchart of an exemplary process performed by a visual representation matching unit, according to an embodiment of the present teaching.

FIG. 12 is a flowchart of an exemplary process performed by a visual representation matching unit, e.g. the visual representation matching unit 740 in FIG. 11, according to an embodiment of the present teaching. A visual representation template is received at 1202 with metadata. A matching model is selected at 1204. A retrieval request for stored templates is generated and sent at 1206. Retrieved one or more visual representation templates are received at 1208.

At 1210, the received and the retrieved visual representation templates are matched to generate matching scores. At 1212, one or more matching thresholds are determined. At 1214, a matching result is generated based on the one or more matching thresholds. At 1216, the matching result is sent for user authentication.

It can be understood that the order of the steps shown in FIG. 12 may be changed according to different embodiments of the present teaching.

Figure 13:
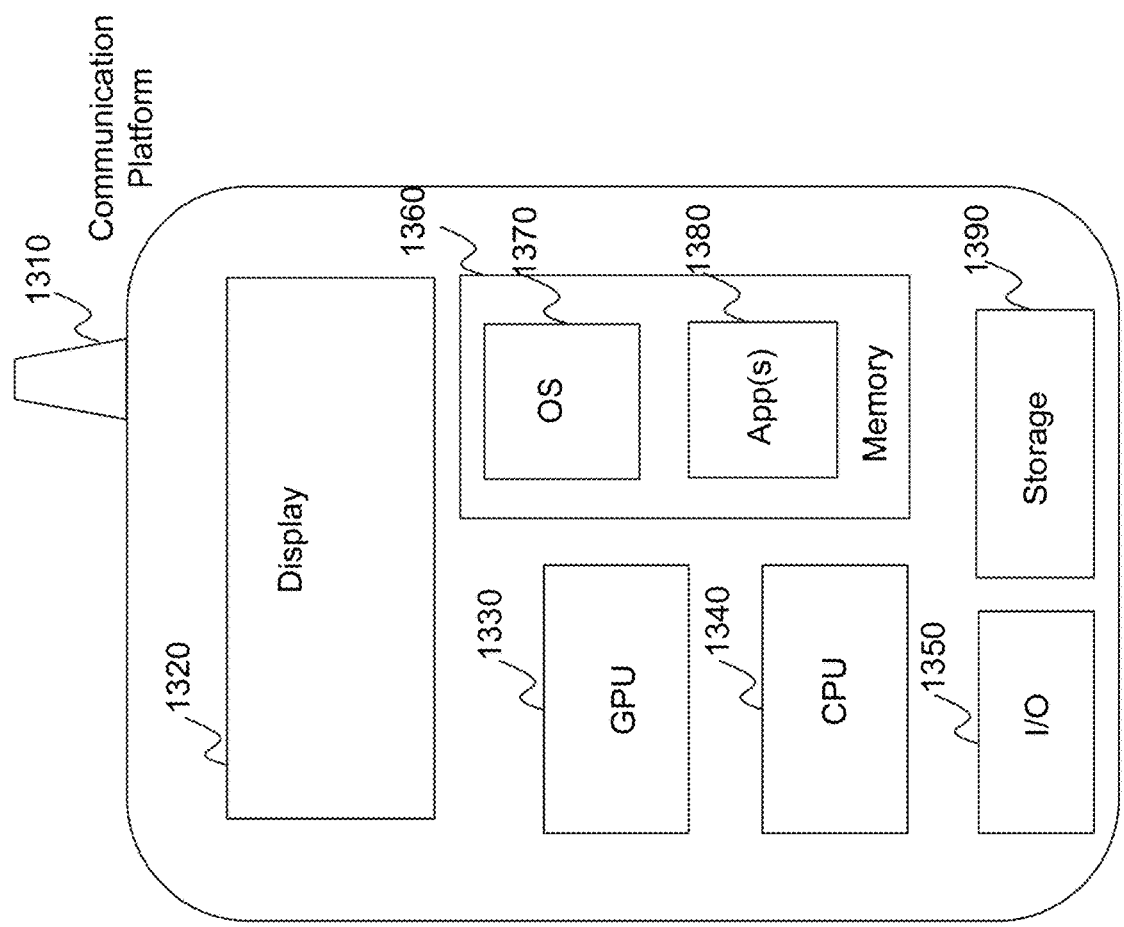
FIG. 13 depicts the architecture of a mobile device which can be used to implement a specialized system incorporating the present teaching.

FIG. 13 depicts the architecture of a mobile device which can be used to realize a specialized system implementing the present teaching. In this example, the user device on which login information is presented and interacted-with is a mobile device 1300, including, but is not limited to, a smart phone, a tablet, a music player, a handled gaming console, a global positioning system (GPS) receiver, and a wearable computing device (e.g., eyeglasses, wrist watch, etc.), or in any other form factor. The mobile device 1300 in this example includes one or more central processing units (CPUs) 1340, one or more graphic processing units (GPUs) 1330, a display 1320, a memory 1360, a communication platform 1310, such as a wireless communication module, storage 1390, and one or more input/output (I/O) devices 1350. Any other suitable component, including but not limited to a system bus or a controller (not shown), may also be included in the mobile device 1300. As shown in FIG. 13, a mobile operating system 1370, e.g., iOS, Android, Windows Phone, etc., and one or more applications 1380 may be loaded into the memory 1360 from the storage 1390 in order to be executed by the CPU 1340. The applications 1380 may include a browser or any other suitable mobile apps for receiving authentication information on the mobile device 1300. User interactions with the authentication information may be achieved via the I/O devices 1350 and provided to the location based visual authentication engine 140 and/or other components of systems 100 and 200, e.g., via the network 120.

To implement various modules, units, and their functionalities described in the present disclosure, computer hardware platforms may be used as the hardware platform(s) for one or more of the elements described herein (e.g., the location based visual authentication engine 140 and/or other components of systems 100 and 200 described with respect to FIGS. 1-12). The hardware elements, operating systems and programming languages of such computers are conventional in nature, and it is presumed that those skilled in the art are adequately familiar therewith to adapt those technologies about user authentication as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 14:
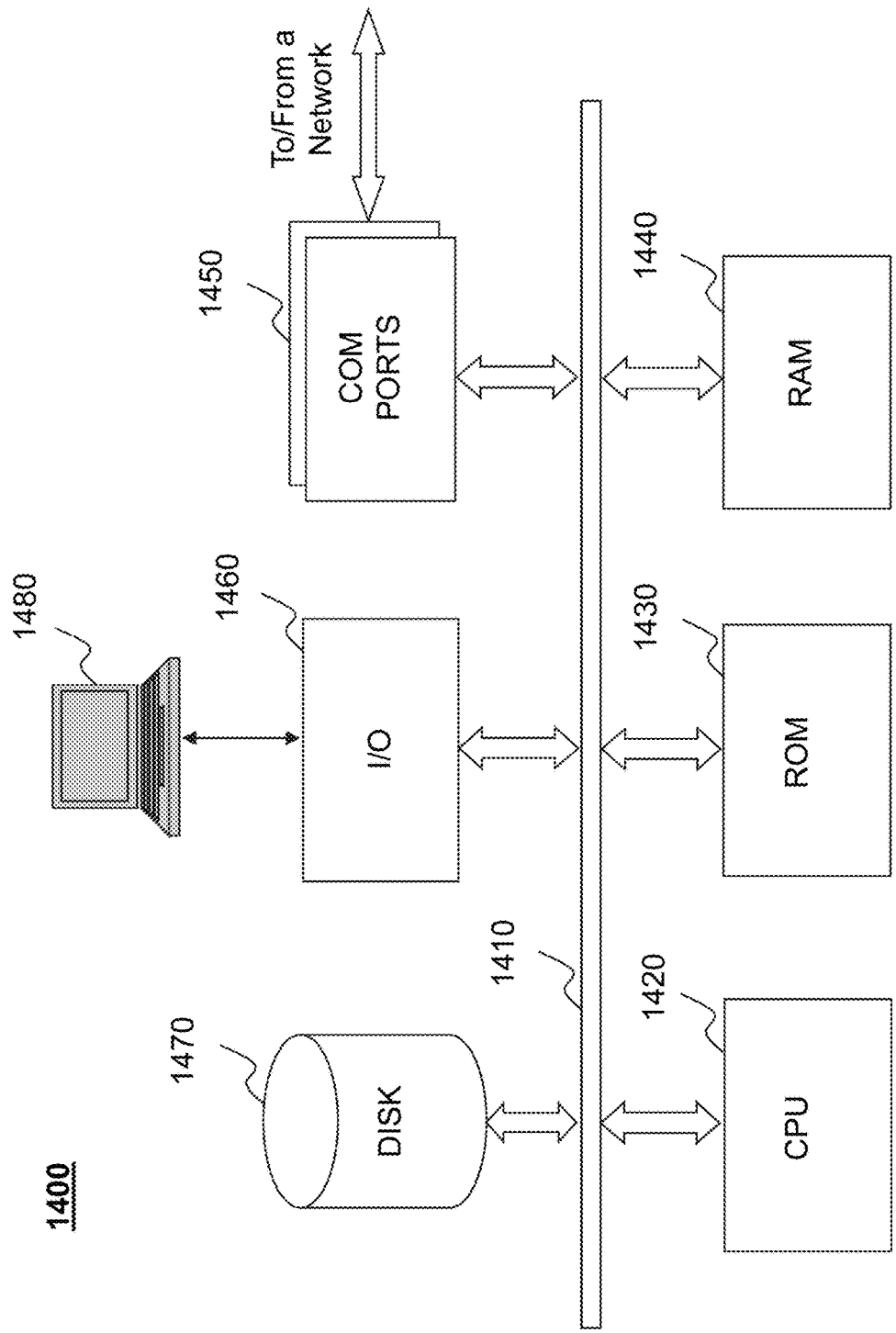
FIG. 14 depicts the architecture of a computer which can be used to implement a specialized system incorporating the present teaching.

FIG. 14 depicts the architecture of a computing device which can be used to realize a specialized system implementing the present teaching. Such a specialized system incorporating the present teaching has a functional block diagram illustration of a hardware platform which includes user interface elements. The computer may be a general purpose computer or a special purpose computer. Both can be used to implement a specialized system for the present teaching. This computer 1400 may be used to implement any component of the user authentication techniques, as described herein. For example, the location based visual authentication engine 140, etc., may be implemented on a computer such as computer 1400, via its hardware, software program, firmware, or a combination thereof. Although only one such computer is shown, for convenience, the computer functions relating to user authentication as described herein may be implemented in a distributed fashion on a number of similar platforms, to distribute the processing load.

The computer 1400, for example, includes COM ports 1450 connected to and from a network connected thereto to facilitate data communications. The computer 1400 also includes a central processing unit (CPU) 1420, in the form of one or more processors, for executing program instructions. The exemplary computer platform includes an internal communication bus 1410, program storage and data storage of different forms, e.g., disk 1470, read only memory (ROM) 1430, or random access memory (RAM) 1440, for various data files to be processed and/or communicated by the computer, as well as possibly program instructions to be executed by the CPU. The computer 1400 also includes an I/O component 1460, supporting input/output flows between the computer and other components therein such as user interface elements 1480. The computer 1400 may also receive programming and data via network communications.

Hence, aspects of the methods of user authentication, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer into the hardware platform(s) of a computing environment or other system implementing a computing environment or similar functionalities in connection with user authentication. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the user authentication as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

I claim:

1. A method, implemented on a machine having at least one processor, storage, and a communication platform connected to a network for user authentication, the method comprising:
   receiving, via the network, a request for authenticating a user, the request including a user identity;
   determining a location of the user;
   obtaining, via the network, a candidate visual representation of the location with a person visually captured therein;
   retrieving one or more visual representations of the location from a database associated with the user identity, wherein the one or more visual representations were previously registered by the user associated with the user identity and visually represent the location with the user captured therein, wherein the location is associated with the user identity, and wherein the one or more retrieved visual representations are stored in the database in association with the user identity and the location;
   comparing the candidate visual representation with the one or more retrieved visual representations to generate one or more comparison results, wherein the one or more comparison results indicate whether there is a match between the candidate visual representation and the one or more retrieved visual representations; and
   authenticating, via the network, the user based on the one or more comparison results.

2. The method of claim 1, further comprising:
   determining, in response to the request being received, that the user is associated with the user identity; and
   accessing the database to retrieve the one or more retrieved visual representations of the location associated with the user identity.

3. The method of claim 2, wherein the one or more retrieved visual representations with the user captured therein visually depict the user within the location.

4. The method of claim 1, wherein comparing further comprises:
   matching the candidate visual representation with the one or more retrieved visual representations to generate one or more scores;
   determining a first threshold and a second threshold; and
   generating the one or more comparison results which indicate whether any of the one or more scores is greater than the first threshold and less than the second threshold.

5. The method of claim 1, further comprising:
   normalizing the candidate visual representation to generate a normalized visual representation;
   detecting one or more entities from the normalized visual representation; and detecting an entity layout in the normalized visual representation to generate a visual representation template, wherein whether the user is authenticated is determined based on the visual representation template and the one or more retrieved visual representations.

6. The method of claim 1, further comprising:
determining a generation time of the candidate visual representation, wherein whether the user is authenticated is determined based on the generation time.

7. The method of claim 6, wherein the generation time of the candidate visual representation is determined based on environmental information extracted from the candidate visual representation.

8. The method of claim 1, wherein the candidate visual representation and the one or more retrieved visual representations belong to a same type of visual representation, and the type of visual representation being at least one of: photos, videos, infrared images, or X-ray images.

9. The method of claim 1, wherein the location of the user is determined from the request based on at least one of: an IP address of the user, GPS, or an AP SSID, the method further comprising:
determining that the candidate visual representation comprises metadata indicating a first location of the candidate visual representation; and
determining, based on the metadata and the at least one of: the IP address of the user, the GPS, or the AP SSID, that the first location comprises the location.

10. The method of claim 1, wherein authenticating the user further comprises:
determining that there is a match between the candidate visual representation and at least one of the one or more retrieved visual representations.

11. The method of claim 1, wherein authenticating the user further comprises:
determining that at least one visual representation of the one or more retrieved visual representations comprises at least one non-human entity visually represented within the location;
determining that the candidate visual representation comprises the at least one non-human entity visually captured therein; and
determining that the candidate visual representation represents the location based on both: (i) the candidate visual representation comprising the at least one non-human entity visually captured therein and the person visually captured therein and (ii) the at least one visual representation comprising the at least one non-human entity visually represented within the location and visually representing the location with the user captured therein.

12. A system having at least one hardware processor, storage, and a communication platform connected to a network for user authentication, comprising:
a request type determiner implemented on the at least one hardware processor and configured for receiving, via the network, a request for authenticating a user, the request including a user identity;
a user location determiner implemented on the at least one hardware processor and configured for determining a location of the user;
a visual representation analyzer implemented on the at least one hardware processor and configured for obtaining, via the network, a candidate visual representation of the location with a person visually captured therein;
a visual representation retriever implemented on the at least one hardware processor and configured for retrieving one or more visual representations of the location from a database associated with the user identity, wherein the one or more visual representations were previously registered by the user associated with the user identity and visually represent the location with the user captured therein, wherein the location is associated with the user identity, and wherein the one or more retrieved visual representations are stored in the database in association with the user identify and the location;
a visual representation matching unit implemented on the at least one hardware processor and configured for comparing the candidate visual representation with the one or more retrieved visual representations to generate one or more comparison results, wherein the one or more comparison results indicate whether there is a match between the candidate visual representation and the one or more retrieved visual representations; and
an authentication determiner implemented on the at least one hardware processor and configured for authenticating the user based on the one or more comparison results.

13. The system of claim 12, further comprising:
a user ID determining determiner implemented on at least one hardware processor and configured for determining, in response to the request being received, that the user is associated with the user identity; and
a location/image association unit implemented on at least one hardware processor and configured for accessing the database to retrieve the one or more retrieved visual representations of the location associated with the user identity.

14. The system of claim 12, wherein the visual representation matching unit comprises:
a matching score generator implemented on the at least one hardware processor and configured for matching the candidate visual representation with the one or more retrieved visual representations to generate one or more scores;
a matching threshold determiner implemented on the at least one hardware processor and configured for determining a first threshold and a second threshold; and
a matching result generator implemented on the at least one hardware processor and configured for generating the one or more comparison results which indicate whether any of the one or more scores is greater than the first threshold and less than the second threshold.

15. The system of claim 12, wherein the visual representation analyzer comprises:
a visual representation normalizer implemented on the at least one hardware processor and configured for normalizing the candidate visual representation to generate a normalized visual representation;
an entity detector configured implemented on the at least one hardware processor and for detecting one or more entities from the normalized visual representation; and
an entity layout detector implemented on the at least one hardware processor and configured for detecting an entity layout in the normalized visual representation to generate a visual representation template, wherein the authentication determiner is configured for determining whether the user is authenticated based on the visual representation template and the one or more retrieved visual representations.

16. The system of claim 12, wherein the visual representation analyzer comprises:

a freshness determiner implemented on the at least one hardware processor and configured for determining a generation time of the candidate visual representation, wherein the authentication determiner is configured for determining whether the user is authenticated based on the generation time.

17. The system of claim 16, wherein the generation time of the candidate visual representation is determined based on environmental information extracted from the candidate visual representation.

18. The system of claim 12, wherein the candidate visual representation and the one or more retrieved visual representations belong to a same type of visual representation, and the type of visual representation being at least one of: photos, videos, infrared images, or X-ray images.

19. A non-transitory machine-readable medium having information recorded thereon for user authentication, wherein the information, when read by the machine, causes the machine to perform the following:
  receiving a request for authenticating a user, the request including a user identity;
  determining a location of the user;
  obtaining a candidate visual representation of the location with a person visually captured therein;
  retrieving one or more visual representations of the location from a database associated with the user identity, wherein the one or more visual representations were previously registered by the user associated with the user identity and visually represent the location with the user captured therein, wherein the location is associated with the user identity, and wherein the one or more visual representations are stored in the database in association with the user identity and the location;
  comparing the candidate visual representation with the one or more retrieved visual representations to generate one or more comparison results, wherein the one or more comparison results indicate whether there is a match between the candidate visual representation and the one or more retrieved visual representations; and
  authenticating the user based on the one or more comparison results.

20. The medium of claim 19, wherein the information, when read by the machine, further causes the machine to perform the following:
  determining, in response to the request being received, that the user is associated with the user identity;
  accessing the database to retrieve the one or more visual representations of the location associated with the user identity.

21. The medium of claim 19, wherein the information, when read by the machine, further causes the machine to perform the following:
  matching the candidate visual representation with the one or more retrieved visual representations to generate one or more scores;
  determining a first threshold and a second threshold; and
  generating the one or more comparison results which indicate whether any of the one or more scores is greater than the first threshold and less than the second threshold.

* * * * *